United States Patent [19]
Yatsu et al.

[11] 4,390,683
[45] Jun. 28, 1983

[54] STRETCHED FILM STRUCTURE OF THE POLY-1,3-PHENYLENE TEREPHTHALATE TYPE

[75] Inventors: Tadao Yatsu; Akira Todo, both of Iwakuni; Toshiki Sotoyama, Ohtake, all of Japan

[73] Assignee: Mitsui Petrochemical Industries Ltd., Tokyo, Japan

[21] Appl. No.: 309,101

[22] Filed: Oct. 6, 1981

[30] Foreign Application Priority Data

Oct. 9, 1980 [JP] Japan ................... 55-140490
Nov. 20, 1980 [JP] Japan ................... 55-162618

[51] Int. Cl.$^3$ .................. C08G 63/02; C08G 63/18
[52] U.S. Cl. ..................... 528/194; 528/195; 528/302; 428/480
[58] Field of Search ............ 528/194, 195, 302; 428/480

[56] References Cited

U.S. PATENT DOCUMENTS

| | | |
|---|---|---|
| 3,160,602 | 12/1964 | Kantor et al. ............ 528/194 X |
| 3,160,604 | 12/1964 | Holub et al. ............. 528/194 X |
| 3,778,410 | 12/1973 | Kuhfuss et al. .......... 528/193 X |
| 3,816,368 | 6/1974 | Kobayashi et al. ....... 528/194 |
| 3,875,119 | 4/1975 | Aoki et al. ............... 528/194 X |
| 4,042,565 | 8/1977 | Hoheisel et al. .......... 528/195 |
| 4,201,856 | 5/1980 | Jackson et al. ........... 528/194 X |

Primary Examiner—Lucille M. Phynes
Attorney, Agent, or Firm—Sherman & Shalloway

[57] ABSTRACT

A monoaxially or biaxially stretched film structure, or a heat-set structure thereof, of an unstretched film of an aromatic polyester of the poly-1,3-phenylene terephthalate type, said aromatic polyester having an intrinsic viscosity, determined in p-chlorophenol at 50° C., of 0.4 to 2.0 and being composed of [A] polybasic carboxylic acid component units consisting of terephthalic acid units ($a_1$) and units ($a_2$) of a polybasic carboxylic acid other than terephthalic acid, the proportion of the units ($a_2$) being up to 25 mole % based on the units ($a_1$) and units ($a_2$) combined, and [B] polyol component units consisting of resorcinol units ($b_1$) and units ($b_2$) of a polyol other than resorcinol, the proportion of the units ($b_2$) being up to 25 mole % based on the units ($b_1$) and ($b_2$) combined.

6 Claims, No Drawings

STRETCHED FILM STRUCTURE OF THE POLY-1,3-PHENYLENE TEREPHTHALATE TYPE

This invention relates to a stretched film structure of an aromatic polyester of the poly-1,3-phenylene terephthalate type, which has excellent heat resistance, fire retardancy (especially self-extinguishing property) and electrical properties and high physical strength properties such as tensile strength and elongation at break, moderate flexibility, and a high degree of surface smoothness.

More specifically, this invention relates to a monoaxially or biaxially stretched film structure, or a heat-set product thereof, of an unstretched film of an aromatic polyester of the poly-1,3-phenylene terephthalate type, said aromatic polyester having an intrinsic viscosity, determined in p-chlorophenol at 50° C., of 0.4 to 2.0 and being composed of [A] polybasic carboxylic acid component units consisting of terephthalic acid units ($a_1$) and units ($a_2$) of a polybasic carboxylic acid other than terephthalic acid, the proportion of the units ($a_2$) being up to 25 mole% (0 to 25 mole%) based on the units ($a_1$) and ($a_2$) combined, and [B] polyol component units consisting of resorcinol units ($b_1$) and units ($b_2$) of a polyol other than resorcinol, the proportion of the units ($b_2$) being up to 25 mole% (0 to 25 mole%) based on the units ($b_1$) and ($b_2$) combined.

The term "film structure", as used in the present invention, denotes a film, a sheet and like structures.

Films and sheets of polyesters have been used widely, and to improve the mechanical properties, such as the tensile strength, elongation, Young's modulus and heat, shrinkage, of such polyester films and sheets, stretched (e.g., monoaxially, biaxially) polyester films and sheets have been proposed. Examples of polyesters used to produce these stretched films and sheets include polyethylene terephthalate, polyethylene-2,6-naphthalate, and terephthalic acid/isophthalic acid/bisphenol A copolyester. Although these polyesters have improved mechanical properties when formed into stretched films and sheets suitable for practical applications, they have low heat resistance. In particular, since polyethylene terephthalate and polyethylene-2,6-naphthalate are flammable, they cannot be used in applications which require heat resistance or fire retardancy.

Various aromatic polyesters derived from aromatic polybasic carboxylic acids and aromatic polyols having excellent heat resistant properties have been proposed in recent years. An example is disclosed in U.S. Pat. No. 3,160,602. Examples 22 and 32 of this patent show the production of an aromatic polyester derived from terephthaloyl chloride and resorcinol. It is also stated that a strong or tough, flexible, transparent film could be formed by pressing the resulting polyester. This patent, however, is quite silent on the stretching of the resulting film.

The present inventors worked on the improvement of the aforesaid poly-1,3-phenylene terephthalate film. This work has led to the discovery that a stretched poly-1,3-phenylene terephthalate film not at all described in the above patent document can be easily produced, and that the resulting stretched film has excellent heat resistance, fire retardancy (especially self-extinguishing property) and electrical properties, excellent physical strength properties such as tensile strength and elongation at break, moderate flexibility, and a high degree of surface smoothness.

The investigations of the present inventors show that an aromatic polyester composed of the aforesaid polybasic carboxylic acid component units [A] and polyol component units [B] and having an intrinsic viscosity, determined in p-chlorophenol at 50° C., of 0.4 to 2.0 can be easily shaped by melt pressing, melt extrusion, etc. and that the resulting unstretched film can be formed into a stretched film structure having the excellent properties mentioned above by monoaxially or biaxially stretching it and if desired, heat-setting the stretched structure. It has been found that a stretched film structure having especially good improved properties can be obtained by performing the aforesaid stretching treatment in such a manner that the monoaxially or biaxially stretched structure has a crystallinity of 15 to 55%.

The aromatic polyester (superpolyester) used in the invention constituting the stretched film structure of the poly-1,3-phenylene terephthalate type is composed of

[A] polybasic carboxylic acid component units consisting of terephthalic acid units ($a_1$) and units ($a_2$) of a polybasic carboxylic acid other than terephthalic acid, the proportion of the units ($a_2$) being up to 25 mole% (0 to 25 mole%) based on the units ($a_1$) and ($a_2$) combined, and

[B] polyol component units consisting of resorcinol units ($b_1$) and units ($b_2$) of a polyol other than resorcinol, the proportion of the units ($b_2$) being up to 25 mole % (0 to 25 mole%) based on the units ($b_1$) and ($b_2$) combined.

The aromatic polyester described above should also have an intrinsic viscosity, determined in p-chlorophenol at 50° C., of 0.4 to 2.0.

The proportion of the polybasic carboxylic acid component other than terephthalic acid is preferably up to 20 mole% (0 to 20 mole%), and the proportion of the polyol other than resorcinol is preferably up to 20 mole% (0 to 20 mole%). The intrinsic viscosity of the aromatic polymer is preferably 0.45 to 1.8.

If the intrinsic viscosity is less than 0.4, satisfactory physical strengths such as tensile strength at break cannot be obtained. If it exceeds 2.0, stretching unevenness tends to occur to cause surface unevenness, and a film structure having a good degree of surface smoothness and a uniform thickness cannot be formed.

The stretched film structure of the invention is obtained by monoaxially or biaxially stretching a melt-shaped unstretched film structure of the above aromatic polyester, and if desired heat-setting the stretched film structure. Preferably, the stretching is carried out to such an extent that the resulting monoaxially or biaxially stretched film structure has a crystallinity of 15 to 55%. If the crystallinity is less than 15%, satisfactory physical strengths are difficult to obtain. If it exceeds 50%, flexural property and flexibility of the product are not satisfactory.

The monoaxially or biaxially stretched or further heat-set film structure of the invention has a density of about 1.34 to about 1.45 g/ml, preferably 1.35 to 1.43 g/ml.

The polybasic carboxylic acid component units [A] of the aromatic polyester used in this invention may contain a small proportion of units ($a_2$) of the polybasic carboxylic acid other than terephthalic acid in addition to the terephthalic acid units ($a_1$).

The polybasic carboxylic acids may be dibasic, tribasic or higher carboxylic acids. For example, the units ($a_2$) may be a combination of dibasic carboxylic acid units ($a_2$-1) other than terephthalic acid units and tribasic or higher carboxylic acid units (a$_2$-2), or at least one type of units (a$_2$-1) or (a$_2$-2). In the polybasic carboxylic acid component units [A], the proportion of the units (a$_2$-2) is preferably up to 5 mole % (0 to 5 mole%), for example 0.01 to 5 mole%, especially 0.1 to 3 mole%.

The aromatic polyester utilized in the present invention may contain a small proportion of units (b$_2$) of a polyol other than resorcinol such as the resorcinol units (b$_1$).

The polyol may be a diol, triol or higher polyol. For example, the other polyol units (b$_2$) may be a combination of units (b$_2$-1) of a diol other than resorcinol and units (b$_2$-2) of a tri- or higher polyol, or at least one type of the units (b$_2$-1) or units (b$_2$-2). When the units (b$_2$-2) is used, their amount is preferably up to 5 mole % (0 to 5 mole %), for example 0.01 to 5 mole%, especially 0.1 to 3 mole%, in the polyol component units [B].

When the aromatic polyester used in this invention contains a hydroxycarboxylic acid, a polyester oligomer of an hydroxycarboxylic acid, or a polyester block polymer of a hydroxycarboxylic acid as a constituent component, an ester of such a constituent component and with the aforesaid polybasic carboxylic acid is included within the category of the polybasic carboxylic acid component units [A]. An ester of the aforesaid constituent with the aforesaid polyol is included within the category of the polyol component units [B].

Examples of dibasic carboxylic acids other than terephthalic acid forming the units (a$_2$-1) include aromatic dicarboxylic acids such as methylterephthalic acid, phenylterephthalic acid, phthalic acid, isophthalic acid, 4-methylisophthalic acid, 5-methylisophthaiic acid, 4-phenylisophthalic acid, 5-phenylisophthalic acid, naphthalenedicarboxylic acids (e.g., naphthalene-2,6-dicarboxylic acid, naphthalene-1,5-dicarboxylic acid, naphthalene-1,4-dicarboxylic acid, naphthalene-2,7-dicarboxylic acid and naphthalene-2,5-dicarboxylic acid), 4,4'-dicarboxydiphenyl ether, bis(4-carboxyphenoxy)methane, bis(4-carboxyphenoxy)ethane, bis(3-carboxyphenoxy)ethane, bis(2-carboxyphenoxy)ethane, bis(4-carboxyphenyl)terephthalate, bis(3-carboxyphenyl)terephthalate, bis(2-carboxyphenyl)terephthalate, bis(4-carboxyphenyl)isophthalate, bis(3-carboxyphenyl) isophthalate, bis(2-carboxyphenyl)isophthalate, bis(4-carboxyphenyl)phthalate, bis(3-carboxyphenyl)phthalate, bis(2-carboxyphenyl)phthalate, mono(4-carboxyphenyl)terephthalate, mono(3-carboxyphenyl)terephthalate, mono(2-carboxyphenyl)terephthalate, mono(2-carboxy-4-methylphenyl)terephthalate, mono(carboxymethyl)terephthalate, mono(1-carboxyethyl)terephthalate, mono(2-carboxyethyl)terephthalate, and mono(3-carboxypropyl)terephthalate; aliphatic dicarboxylic acids such as malonic acid, succinic acid, 2-methylsuccinic acid, glutaric acid, adipic acid, pimelic acid, suberic acid, azelaic acid, sebacic acid, undecanedioic acid, dodecanedioic acid, and brassylic acid; and alicyclic dicarboxylic acids such as 1,2-cyclohexanedicarboxylic acid, 1,3-cyclohexanedicarboxylic acid and 1,4-cyclohexanedicarboxylic acid.

Examples of tribasic or higher carboxylic acids forming the units (a$_2$-2) include tribasic or higher aromatic carboxylic acids such as trimellitic acid, hemimellitic acid, pyromellitic acid, naphthalenepolycarboxylic acids (e.g., naphthalene-2,3,6-tricarboxylic acid, naphthalene-2,3,7-tricarboxylic acid, naphthalene-2,4,6-tricarboxylic acid, naphthalene-2,4,6,7-tetracarboxylic acid, naphthalene-1,4,5,8-tetracarboxylic acid and naphthalene-1,3,5,7-tetracarboxylic acid), mono(2,3-dicarboxyphenyl)terephthalate, mono(2,4-dicarboxyphenyl)terephthalate, mono(2,5-dicarboxyphenyl)terephthalate, mono(2,6-dicarboxyphenyl)terephthalate, mono(3,4-dicarboxyphenyl)terephthalate, mono(3,5-dicarboxyphenyl)terephthalate, mono(2,3-dicarboxyphenyl)isophthalate, mono(2,4-dicarboxyphenyl)terephthalate, mono(2,5-dicarboxyphenyl)isophthalate, mono(2,6-dicarboxyphenyl)isophthalate, mono(3,4-dicarboxyphenyl)isophthalate, mono(3,5-dicarboxyphenyl)isophthalate, mono(2,4-dicarboxyphenyl)phthalate, mono(2,5-dicarboxyphenyl)phthalate, mono(3,4-dicarboxyphenyl)phthalate, mono(3,5-dicarboxyphenyl)phthalate, 1-carboxy-2,3-bis(4-carboxybenzoyloxy)benzene, 1-carboxy-2,4-bis(4-carboxybenzoyloxy)benzene, 1-carboxy-2,5-bis(4-carboxybenzoyloxy)benzene, 1-carboxy-2,6-bis-(4-carboxybenzoyloxy)benzene, 1-carboxy-3,4-bis(4-carboxybenzoyloxy)benzene, 1-carboxy-3,5-bis(4-carboxybenzoyloxy)benzene, 1-carboxy-2,3-bis(3-carboxybenzoyloxy)benzene, 1-carboxy-2,4-bis(3-carboxybenzoyloxy)benzene, 1-carboxy-2,5-bis(3-carboxybenzoyloxy)benzene, 1-carboxy-2,6-bis(3-carboxybenzoyloxy)benzene, 1-carboxy-3,4-bis(3-carboxybenzoyloxy)benzene, 1-carboxy-3,5-bis(3-carboxybenzoyloxy)benzene, 1-carboxy-2,3-bis(2-carboxybenzoyloxy)benzene, 1-carboxy-2,4-bis(2-carboxybenzoyloxy)benzene, 1-carboxy-2,5-bis(2-carboxybenzoyloxy)benzene, 1-carboxy-2,6-bis(2-carboxybenzoyloxy)benzene, 1-carboxy-3,4-bis(2-carboxybenzoyloxy)benzene, 1-carboxy-3,5-bis(2-carboxybenzoyloxy)benzene, 1,2-dicarboxyethyl terephthalate, 1,2-dicarboxyethyl isophthalate, 1,2-dicarboxyethyl phthalate, 1,2-dicarboxyethyl phthalate, 1-carboxy-1,2-bis(4-carboxybenzoyloxy)ethane, 1-carboxy-1,2-bis(3-carboxybenzoyloxy)ethane, and 1-carboxy-1,2-bis(2-carboxybenzoyloxy)ethane; and tribasic or higher aliphatic carboxylic acids such as propane-1,2,3-tricarboxylic acid and butane-1,2,3,4-tetracarboxylic acid.

Those aromatic polyesters in accordance with this invention which contain units (a$_1$-2) of the above-exemplified tribasic or higher carboxylic acids have a branched chain structure or a partially crosslinked structure. Because of this characteristic, the use of such polyesters as the aromatic polyester in the invention offers the advantage that stretched film structures having further improved impact strength and tear strength can generally be obtained.

Examples of diols other than resorcinol which form the units (b$_2$-1) include aromatic diols other than resorcinol, such as 4-methylresorcinol, 5-methylresorcinol, 1,3-bis(hydroxyethoxy)benzene, catechol, 4-methylcatechol, 5-methylcatechol, 4-ethylcatechol, 5-ethylcatechol, 4-isopropylcatechol, 5-isopropylcatechol, 1,2-bis(hydroxyethoxy)benzene, hydroquinone, methylhydroquinone, ethylhydroquinone, isopropylhydroquinone, tert-butylhydroquinone, 1,4-bis(hydroxyethoxy)benzene, bis(4-hydroxyphenyl)methane, bis(4-hydroxyethoxyphenyl)methane, 1,1-bis(4-hydroxyphenyl)ethane, 1,1-bis(4-hydroxyphenyl)propane, 2,2-bis(4-hydroxyphenyl)propane, 2,2-bis(4-hydroxyethoxyphenyl)propane, 2,2-bis(4-hydroxy)butane, 2,2-bis(4-hydroxyphenyl)pentane, bis(4-hydroxyphenoxy)methane, 1,2-bis(4-hydroxyphenoxy)ethane, 1,2-bis(4-hydroxyphenoxy)propane, 1,4-bis(4-hydroxyphenoxy)butane, bis(3-hydroxyphenoxy)methane, 1,2-bis(3-hydroxyphenoxy)ethane, 1,2-bis(3-hydroxyphenoxy)propane, bis(2-hydroxyphenoxy)methane, 1,2-bis(2-hydroxyphenoxy)ethane, bis(2-hydroxy-5-chlorophenyl)methane, 2,2-bis(3,5-dibromo-4-hydroxyphenyl)propane, 2,2-bis(3,5-dichloro-4-hydroxyphenyl)propane, bis(3,5-dimethyl-4-hydroxyphenyl)propane, 2,2-bis(3,5-di-tert-butyl-4-hydroxyphenyl)methane, 2,2-bis(di-tert-butyl-4-hydroxyphenyl)propane, bis(4-hydroxyphenyl)sulfone, 4,4'-dihydroxyphenol sulfide, 4,4'-dihydroxydiphenyl ketone, bis(4-hydroxyphenyl)sulfone, 3,3',5,5'-tetrabromo-4,4'-dihydroxydiphenyl sulfone, 3,6-dihydroxy-9,9-dimethylxanthene, 4-hydroxyphenyl 4-hydroxybenzoate, 3-hydroxyphenyl 4-hydroxybenzoate, 2-hydroxyphenyl 4-hydroxybenzoate, 4-hydroxyphenyl 3-hydroxybenzoate, 3-hydroxyphenyl 3-hydroxybenzoate, 2-hydroxyphenyl 3-hydroxybenzoate, 4-hydroxyphenyl 2-hydroxybenzoate, 4-hydroxyphenyl cresylate, 3-hydroxyphenyl cresylate, 2-hydroxyphenyl cresylate, 4-hydroxyphenyl glycollate, 3-hydroxyphenyl glycollate, 2-hydroxyphenyl glycollate, 4-hydroxyphenyl lactate, 3-hydroxyphenyl lactate, 2-hydroxyphenyl lactate, 4-hydroxyphenyl 2-hydroxyacrylate, 3-hydroxyphenyl 2-hydroxyacrylate, 2-hydroxyphenyl 2-hydroxybutyrate, 4-hydroxyphenyl 2-hydroxybutyrate, and 2-hydroxyphenyl 2-hydroxybutyrate; aliphatic diols, such as ethylene glycol, propylene glycol, 1,3-propanediol, 1,4-butanediol, 1,3-butanediol, 1,2-butanediol, diethylene glycol, triethylene glycol, 1,5-hexanediol, hexamethylene glycol, 1,8-octanediol and 1,12-dodecanediol; and alicyclic diols such as 1,2-cyclopentanediol, 1,3-cyclopentanediol, 1,2-cyclohexanediol, 1,3-cyclohexanediol, 1,4-cyclohexanediol, 1,3-cyclohexane dimethanol, and 1,4-cyclohexane dimethanol.

Those aromatic polyesters in accordance with this invention which contain the units ($b_2$-1) of diols other than the resorcinol have increased moldability in the production of stretched film structure, and the heat stability of the resulting stretched film structures is not reduced. Those aromatic polyesters in accordance with this invention which contain aliphatic diol component units have increased moldability in the production of stretched film structures, and the resulting stretched film structures have increased elongation, impact strength and tear strength.

Examples of trihydric or higher alcohols forming the units ($b_2$-2) include trihydric or higher aromatic alcohols such as pyrogallol, phloroglucinol, 2,2',4,4'-tetrahydroxydiphenyl sulfide, 3-hydroxyphenyl 2,3-dihydroxybenzoate, 3-hydroxyphenyl 2,4-dihydroxybenzoate, 3-hydroxyphenyl 2,5-dihydroxybenzoate, 3-hydroxyphenyl 2,6-dihydroxybenzoate, 3-hydroxyphenyl 3,4-dihydroxybenzoate, 3-hydroxyphenyl 3,5-dihydroxybenzoate, 4-hydroxyphenyl 2,3-dihydroxybenzoate, 4-hydroxyphenyl 2,4-dihydroxybenzoate, 4-hydroxyphenyl 2,5-dihydroxybenzoate, 4-hydroxyphenyl 3,4-dihydroxybenzoate, 4-hydroxyphenyl 3,5-dihydroxybenzoate, 1-hydroxy-2,3-bis(3-hydroxyphenoxycarbonyl)benzene, 1-hydroxy-2,4-bis(3-hydroxyphenoxycarbonyl)benzene, 1-hydroxy-2,5-bis(3-hydroxyphenoxycarbonyl)benzene, 1-hydroxy-2,6-bis(3-hydroxyphenoxycarbonyl)benzene, 1-hydroxy-3,4-bis(3-hydroxyphenoxycarbonyl)benzene, 1-hydroxy-3,5-bis(3-hydroxyphenoxycarbonyl)benzene, 1-hydroxy-2,4-bis(4-hydroxyphenoxycarbonyl)benzene, 1-hydroxy-2,5-bis(4-hydroxyphenoxycarbonyl)benzene, 1-hydroxy-2,6-bis(4-hydroxyphenoxycarbonyl)benzene, 1-hydroxy-3,4-bis(4-hydroxyphenoxycarbonyl)benzene, 1-hydroxy-3,5-bis(4-hydroxyphenoxycarbonyl)benzene, 1-hydroxy-1,2-bis(3-hydroxyphenoxycarbonyl)ethane, 1-hydroxy-1,2-bis(4-hydroxyphenoxycarbonyl)ethane, 1-hydroxy-1,2-bis(2-hydroxyphenoxycarbonyl)ethane, 1,2-dihydroxy-1-(3-hydroxyphenoxycarbonyl)ethane, 1,2-dihydroxy-1-(4-hydroxyphenoxycarbonyl)ethane, 1,2-dihydroxy-1-(2-hydroxyphenoxycarbonyl)ethane, 3-hydroxyphenyl 3,5-dihydroxyphenoxybenzoate, 4-hydroxyphenyl 3,5-dihydroxybenzoate, 2-hydroxyphenyl 3,5-dihydroxybenzoate, 3-hydroxyphenyl 2,4-dihydroxybenzoate, 4-hydroxyphenyl 2,4-dihydroxybenzoate, 2-hydroxyphenyl 2,4-dihydroxybenzoate, 3-hydroxy-1,2-bis(3-hydroxyphenoxycarbonyl)benzene, 1-hydroxy-1,2-bis(3-hydroxyphenoxycarbonyl)ethane and 3-hydroxyphenyl 1,2-dihydroxyacrylate; trihydric or higher aliphatic alcohols such as glycerol, 1,2,3,4-tetrahydroxybutane and pentaerythritol; and trihydric or higher alicyclic alcohols such as 1,2,3-cyclohexanetriol and 1,3,5-cyclohexanetriol.

Those aromatic polyesters in accordance with this invention which contain the above-exemplified units ($b_2$-2) have a branched chain structure or a partially crosslinked structure, and stretched film structures prepared from these polyesters have increased elongation, impact strength and tear strength.

The aromatic polyesters utilized in the present invention can be produced by various known methods.

Examples of the manufacturing methods include (1) a method which comprises polycondensing the above-exemplified polybasic carboxylic acid and/or its functional derivative and the above-exemplified polyol and/or its functional derivative; (2) a method which comprises preparing from two or more polyesters produced by the method (1) a graft polymer or a block polymer by ester-interchange reaction or other reactions, thereby adjusting the composition of the final polyester to that specified hereinabove; (3) a method which comprises polymerizing the above-exemplified polybasic carboxylic acid and/or its functional derivative and the above-exemplified polyol and/or its functional derivative in the presence of at least one polyester produced by method (1) or other methods, and at the same time preparing a graft polymer of a block polymer by ester-interchange reaction or other reactions, thereby adjusting the composition of the final polyester to that specified hereinabove: (4) a method which comprises first reacting the above-exemplified polybasic carboxylic acid and/or another polybasic carboxylic acid and/or a functional derivative of any of these with the above-exemplified polyol and/or another polyol and/or a functional derivative of any of these to form low polymers of polyester, and polycondensing two or more such low polymers, thereby adjusting the composition of the final polyester to that specified hereinabove; (5) a method which comprises polycondensing at least one low polymer produced by the method (4) and the above-exemplified polybasic carboxylc acid and/or another polybasic carboxylic acid and/or a functional derivative of any of these and the above-exemplified polyol and/or another polyol and/or a functional derivative of any of these, thereby adjusting the composition of the final polyester to that specified hereinabove; and (6) a method which comprises polymerizing at least one polyester low polymer produced by the method (4), in the presence of at least one polyester produced by the method (1) or other methods, and at the same time forming a graft polymer or a block polymer by ester-interchange reaction or other reactions, thereby adjusting the composition of the final polyester to that specified hereinabove.

Specific procedures of producing the polyesters by polycondensation [method (1) above] of the above-exemplified polybasic carboxylic acid and/or its functional derivative and the above-exemplified polyol and/or its functional derivative include, for example, (a) polycondensation in the molten state, (b) polycondensation in solution, (c) interfacial polycondensation, and (d) polycondensation by the aforesaid melting, solution, or interfacial method, followed by polycondensation in the solid state.

The polyesters prepared by the various methods exemplified above may be used as prepared. Or they can be used in the form of polyesters having stabilized molecular terminals obtained by esterifying the carboxyl or phenolic hydroxyl groups present in the molecular terminals of the resulting polyesters with monofunctional compounds such as monohydric alcohols or monobasic carboxylic acids. Or the polyesters having stabilized molecular terminals can be obtained by producing the polyesters by the above methods in the presence of such monofunctional compounds for molecular weight control.

Preferably, the film structure of the poly-1,3-phenylene terephthalate type in accordance with this invention is biaxially stretched. In the case of monoaxial stretching, the stretch ratio is, for example, from 0.2 to 10, preferably from 0.3 to 7, especially preferably from 0.5 to 5. In the case of biaxial stretching, the stretch ratio is, for example, from 0.2 to 8, preferably from 0.3 to 6, especially preferably from 0.5 to 5, in the longitudinal direction (machine direction), and, for example, from 02 to 8.0, preferably from 0.3 to 6.0, especially preferably from 0.5 to 5.0, in the transverse direction (in a direction traversing the machine direction).

The monoaxially or biaxially stretched film structure of the invention may have varying thicknesses, for example from about 2 microns to about 500 microns.

The stretched film structure of the invention may be obtained by stretching an unstretched film of the specified aromatic polyester alone, or of a composition comprising the aromatic polyester and suitable additives. Examples of such additives include nucleating agents, inorganic fillers, lubricants, slip agents, antiblocking agents, stabilizers, antistatic agents, anticlouding agents, piments, and dyes. These additives may be incorporated into the aromatic polyester as produced, or may be added during the production of the aromatic polyesters.

Examples of the nucleating agents are fine powders of inorganic materials such as talc, silica, kaolin, clay, bentonite, sericite, carbon, glass and gypsum, the oxides, sulfates, carbonates, phosphates, aromatic and aliphatic carboxylates of metals of Group I or II of the periodic table such as lithium, sodium, potassium, calcium, barium, strontium and zinc, and polyalkylene glycols. The proportion of the nucleating agent used is, for example, 0.005 to 5% by weight, preferably 0.01 to 2% by weight, based on the polyester.

Examples of the inorganic fillers include calcium carbonate, silica, carbon black, kaolin, silicic acid, titanium dioxide, clay, bentonite, sericite, glass, gypsum, and talc. The proportion of the inorganic filler used is, for example, 0.005 to 5% by weight, preferably 0.01 to 2% by weight, based on the polyester.

Examples of the lubricants, slip agents and/or antiblocking agents include the aliphatic carboxylates (e.g., acetates), aromatic carboxylates (e.g., benzoates and terephthalates) of metals of Group I or II of the periodic table such as lithium, calcium, magnesium, barium and strontium, and inorganic materials such as silica, kaolin, calcium carbonate, silicic acid, clay, talc, and aluminum silicate. The proportion of these additives are, for example, from 0.005 to 5% by weight, preferably from 0.01 to 2% by weight, based on the polyester.

The stabilizers may be those normally used for polyesters. Specific examples include phosphoric acid, phosphorus acid, hypophosphorous acid, phosphate esters such as trimethyl phosphate, triethyl phosphate, triphenyl phosphate, monobutyl phosphate and diethyl phosphate, phosphite esters such as trimethyl phosphite, 1,3,5-trimethyl-2,4,6-tris(3,5-di-tert-butyl-4-hydroxybenzyl)benzene and tetrakis[methylene-3-(3,5-di-tert-butyl-4-hydroxyphenyl)propionate]methane. The proportion of the stabilizers used is, for example, 0.005 to 5% by weight.

The pigments or dyes may be those normally used for polyesters. Their amounts may be those which can impart desired coloration.

The stretched film structure of the poly-1,3-phenylene terephthalate resin in accordance with this invention is produced from an aromatic polyester having an intrinsic viscosity, determined in p-chlorophenol at 50° C., of 0.2 to 2.0 and composed of the polybasic carboxylic acid component units [A] and the polyol component units [B] described hereinabove.

The stretched film structure of the invention can be produced by monoaxially or biaxially stretching an unstretched film structure of the above aromatic polyester and if desired, heat-setting the stretched film structure. Known conventional means for forming stretched films from film-forming synthetic resins can be utilized to produce unstretched film structures of the aromatic polyesters used in the invention, stretch the unstretched film structures and heat-set the stretched film structures.

For example, the aromatic polyester with or without the above-exemplified additives is molded by known melt molding means such as melt pressing or melt extrusion to form an unstretched film structure. The unstretched film structure is cooled to a temperature preferably below the glass transition point of the unstretched film structure, and then stretched monoaxially or biaxially at a temperature ranging from the glass transition point to the melting point of the film structure at the above-exemplified stretch ratio. The stretching temperature is, for example, about 140° C. to about 290° C., preferably about 140° C. to about 230° C. Instead of the above melt molding method, a solution of the aromatic polyester with or without the above-exemplified additives may be cast to form an unstretched film structure. To prepare the casting solution, there can be used such a solvent as p-chlorophenol, o-chlorophenol or 2,4,6-trichlorophenol.

If desired, the stretched film structure of the invention may be subjected to heat-setting treatment. Heat setting may be carried out by methods known per se. For example, it can be carried out under elongating conditions which cause elongating of the stretched film structure, under taut conditions which do not substantially elongate the stretched film structure nor cause its relaxing, or under relaxing conditions which allow restricted or free shrinkage of the stretched film structure. Preferably, the heat-setting is carried out under conditions which do not substantially cause elongation of the stretched film structure nor cause its relaxing. The heat-setting temperature can be suitably selected. Preferably, it is the stretching temperature exemplified above or a temperature slightly higher than it. For example, the heat-setting is carried out at a temperature of about 140° to about 300° C., preferably about 160° to about 280° C. The heat-setting time can also be suitably selected, and for example, it is about 5 seconds to about 600 seconds.

The stretched film structure of the poly-1,3-phenylene terephthalate of the invention may be in the form of a monoaxially stretched or biaxially stretched film structure depending, for example, upon its end uses. A biaxially stretched blow-molded container obtained by blow molding in the biaxially oriented state also comes within the scope of the stretched film structure of the invention.

The stretching can be performed by any known stretching operations, for example monoaxial stretching, biaxial stretching in which the unstretched film is stretched in the longitudinal direction and then in the transverse direction, biaxial stretching in which the unstretched film structure is stretched simultaneously in the longitudinal and transverse directions. If desired, the aforesaid biaxial stretching may be followed by further stretching in the longitudinal direction and/or the transverse directions either successively and/or simultaneously. There can also be employed a method which involves cooling a parison composed of the aromatic polyester with or without the above-exemplified additives to a stretching temperature within the above-specified range, stretching the parison in the longitudinal direction, and then blow-molding the parison to stretch it in the transverse direction (biaxial stretching blow molding).

In performing the monoaxial stretching treatment, the stretched film structure may be obtained by stretching the unstretched film structure by means of a stretching machine such as a tensile tester, a monoaxial stretcher or a biaxial stretcher at temperatures in the above-specified range. Or a monoaxially stretched film structure can be obtained by passing the unstretched film structure between at least one pair of heated rolls heated at the above temperature and having different speeds of rotation. Alternatively, the monoaxially stretched film structure can also be obtained by passing the unstretched film structure between two snap rolls having different speeds of rotation while bringing it into frictional contact with a hot plate kept at the above-specified temperature and placed between the snap rolls. In the case of biaxial stretching, an unstretched film structure or parison of the aromatic polyester with or without the above-exemplified additives is stretched in the longitudinal direction at the above temperature and then further stretched in the transverse direction, or simultaneously in the longitudinal and transverse directions at the above-specified temperature. For example, the unstretched film structure is stretched biaxially by using a machine capable of performing stretching such as a tensile tester or a biaxial stretcher at the above-specified temperature; or passed through the aforesaid hot rolls to stretch it in the longitudinal direction and then passed through a similarly heated tenter to stretch it in the transverse direction; or passed between the above hot rolls to stretch it in the longitudinal direction and simultaneously passed through a tenter to stretch it is the transverse direction; or stretched biaxially by a tubular method at the above-specified temperature. Alternatively, the aforesaid biaxial stretching methods are repeatedly performed at the above temperature, or such methods are combined to perform stretching a number of times. It is also possible to perform biaxial stretching by blow molding a parison of the aromatic polyester at the above-specified temperature.

Known conventional methods can all be used in this invention to produce the unstretched film structure (including parison) of the aromatic polyester with or without the various additives.

The stretched film structure of the poly-1,3-phenylene terephthalate type in accordance with this invention has excellent heat resistance, fire retardancy (particularly self-extinguishing property) and electrical properties, high physical strength properties such as tensile strength and elongation at break, moderate flexibility, and a high degree of surface smoothness, and can be used in various applications which require these properties.

Furthermore, since the heat-set stretched film structure in accordance with this invention have the property of shrinking to different degrees at an elevated temperature depending upon the extent of heat-setting treatment, it can also be used as a shrinkable film.

Advantageously, the stretched film structure of the invention is useful as electrical insulations, magnetic tapes, photographic films and metal vapor-deposited films. More specifically, it can be used for electrical insulation in electrical machines and instruments such as motors and transformers, electric cables and wires, condensers, insulative adhesive tapes and printed circit boards. As magnetic tapes, it can be used in electronic computers, videotape recorders, audio instruments. As photographic films, it can be used in radiography, electrophotography, motion picture films, and microfilms. It can also be used as substrates in printing, plate-making, copying, etc. As metal-deposited films, it can be used for gold and silver decorative yarns, labels, and condensers. As a shrinkable film, the stretched film structure of the invention can also be used for packaging foodstuffs, etc.

The following Examples illustrate the present invention more specifically. All parts in these examples are by weight unless otherwise specified.

EXAMPLE 1

(1) A reactor was charged with 1000 parts of diphenyl terephthalate, 346 parts of resorcinol, 1.03 parts of triphenyl phosphate and 0.18 part of antimony trioxide, and they were reacted at 250° C. for 22 hours while distilling off the resulting phenol out of the reaction system. Then, 15 parts of resorcinol was added to the reaction mixture, and reacted at 260° C. for 4 hours. The pressure of the reaction system was gradually reduced over the course of 4 hours, and the pressure was finally adjusted to 0.7 mmHg. At the same time, the temperature was raised to 345° C. There was obtained poly-1,3-phenylene terephthalate having an intrinsic viscosity of 0.67 and a melting point of 290° C.

(2) The polyester obtained was compression-molded at 310° C. and 100 kg/cm$^2$ by means of a press former, and quenched to form a transparent sheet having a thickness of 1 mm. The sheet was monoaxially stretched to 3.5 times at 180° C. by means of an Instron tensile tester at a stretching rate of 1.7X/min. to form a monoaxially stretched sheet having an average thickness of 290 microns. The monoaxially stretched sheet was subjected to a tensile test. It had a tensile strength of 1420 kg/cm$^2$ and an elongation of 18% at break.

When this monoaxially stretched sheet was subjected to the tensile test after it was maintained at 150° C. for 24 hours, its tensile strength at break was 1400 kg/cm$^2$.

The sheet was further subjected to a flame resistance test. The molten surface of the sheet was carbonized, but its burning did not continue. Thus, this sheet was found to be self-extinguishing.

The methods of measurement of the properties in the examples were as follows:
Tensile strength and modulus of elasticity: JIS K-7113
Tear strength: JIS K-6781
Crystallinity: Measured by broad angle X-ray
Volume resistivity: JIS C-2318
Flame resistance: in accordance with UL-94746

Smoothness of film surface: The thickness of a film having a length of 20 mm and a width of 20 mm was measured at five points, and whichever larger of the difference between the maximum thickness and the average thickness and the difference between the minimum thickness and the average thickness was defined as the smoothness.

Table 1 summarizes the properties of the stretched film structures obtained in Examples 1, 6, 16, 19, 24, 30, 31, 34, 36, 38, 42, 43, 44, 45 and 46 and Comparative Examples 1 to 4.

TABLE 1

| | Example | | | | | | | | | | | | | | | Comparative Example | | | |
|---|---|---|---|---|---|---|---|---|---|---|---|---|---|---|---|---|---|---|---|
| | 1 | 6 | 16 | 19 | 24 | 30 | 31 | 34 | 36 | 38 | 42 | 43 | 44 | 45 | 1 | 2 | 3 | 4 |
| Intrinsic viscosity (η) of the polyester (dl/g) | 0.67 | 0.67 | 0.72 | 0.72 | 0.72 | 1.3 | 0.69 | 0.72 | 0.71 | 0.69 | 0.65 | 0.67 | 0.91 | 0.7 | 0.67 | 0.69 | 0.38 | 2.08 |
| Stretching conditions | | | | | | | | | | | | | | | | | | |
| Machine direction | | | | | | | | | | | | | | | | | | |
| Temperature (°C.) | 180 | 180 | 175 | 175 | 175 | 180 | 175 | 180 | 180 | 175 | 175 | 180 | 170 | 185 | — | — | 180 | 185 |
| Rate (x/min.) | 1.7 | 1.7 | 4.7 | 4.7 | 4.7 | 0.7 | 5.0 | 4.7 | 1.7 | 10 | 10 | 5 | 5 | 5 | — | — | 1.7 | 1.7 |
| Ratio | 3.5 | 3.5 | 2.5 | 2.5 | 2.5 | 2.5 | 3.0 | 2.5 | 2.5 | 2.5 | 3.0 | 3.0 | 3.0 | 3.0 | — | — | 2.0 | 3.0 |
| Transverse direction | | | | | | | | | | | | | | | | | | |
| Temperature (°C.) | — | — | 175 | 175 | 175 | — | — | 180 | 180 | 175 | 175 | 180 | 170 | 185 | — | — | — | — |
| Rate (x/min.) | — | — | 4.7 | 4.7 | 4.7 | — | — | 4.7 | 4.7 | 10 | 10 | 5 | 5 | 5 | — | — | — | — |
| Ratio | — | — | 2.5 | 2.5 | 2.0 | — | — | 2.5 | 2.5 | 2.5 | 3.0 | 3.0 | 3.0 | 3.0 | — | — | — | — |
| Heat-setting conditions | | | | | | | | | | | | | | | | | | |
| Temperature (°C.) | — | 240 | — | 240 | — | — | — | — | 250 | — | — | — | — | — | — | — | — | — |
| Time (sec.) | — | 60 | — | 60 | — | — | — | — | 60 | — | — | — | — | — | — | — | — | — |
| Properties of the films | | | | | | | | | | | | | | | | | | |
| Crystallinity (%) | 23 | 26 | 25 | 27 | 25 | 25 | 20 | 22 | 22 | 22 | 19 | 23 | 20 | 25 | 0 | 0 | 25 | 19 |
| Thickness (microns) | 290 | 290 | 160 | 160 | 100 | 400 | 330 | 150 | 80 | 70 | 110 | 110 | 110 | 110 | 510 | 510 | 260 | 310 |
| Tensile Strength (kg/cm²) | | | | | | | | | | | | | | | | | | |
| Machine direction | 1420 | 1570 | 1620 | 1800 | 1500 | 1440 | 1900 | 1590 | 1850 | 1600 | 1690 | 1630 | 1480 | 1820 | 690 | 630 | 560 | 650 |
| Transverse direction | — | — | 1620 | 1800 | 1460 | — | — | 1590 | 1850 | 1600 | 1690 | 1630 | 1480 | 1820 | — | — | — | — |
| Elongation (%) | | | | | | | | | | | | | | | | | | |
| Machine direction | 18 | 14 | 18 | 19 | 18 | 36 | 23 | 29 | 21 | 28 | 36 | 30 | 35 | 25 | 31 | 33 | 13 | 2 |
| Transverse direction | — | — | 18 | 19 | 19 | — | — | | 21 | 28 | 36 | 30 | 35 | — | — | — | — | — |
| Tensile strength (kg/cm²) after maintaining at 150° C for 24 hours | | | | | | | | | | | | | | | | | | |
| Machine direction | 1400 | 1560 | 1600 | 1800 | 1520 | — | 1890 | 1600 | 1860 | 1510 | 1500 | 1600 | 1440 | — | — | — | — | — |
| Transverse direction | — | — | 1600 | 1800 | 1500 | — | — | 1600 | 1850 | 1510 | 1500 | 1600 | 1400 | — | — | — | — | — |
| Modulus of elasticity (kg/cm²) | | | | | | | | | | | | | | | | | | |
| Machine direction | 52,900 | 56,100 | 55,400 | 56,600 | 54,000 | 56,000 | 51,200 | 47,700 | 48,000 | 49,400 | 43,000 | 46,500 | 43,500 | 57,800 | 13,600 | 12,800 | 950 | 11,000 |
| Transverse direction | — | — | 55,400 | 56,600 | 53,600 | — | — | 47,700 | 48,000 | 49,400 | 43,000 | 46,500 | 43,500 | 57,800 | — | — | — | — |
| Surface smoothness (microns) | 3 | 3 | 2 | 2 | 2.5 | 3 | 4 | 2 | 3 | 2 | 3 | 2 | 2 | 2 | 4 | 4 | 3 | 52 |
| Flame resistance | V-0 | V-0 | V-0 | V-0 | V-0 | V-0 | V-0 | V-0 | V-0 | V-0 | V-1 | V-1 | V-1 | V-0 | V-0 | V-0 | — | — |

EXAMPLES 2 TO 5

The same poly-1,3-phenylene terephthalate as prepared in Example 1, (1) was compression-molded under the same conditions as in Example 1, (2) to form a 1 mm-thick sheet. It was monoaxially stretched under the various stretching conditions as shown in Table 2 by an Instron tensile tester. The properties of the resulting monoaxially stretched sheets are also shown in Table 2.

TABLE 2

| | Stretching conditions | | | Properties of monoaxially stretched sheet | | | |
|---|---|---|---|---|---|---|---|
| Example | Temperature (°C.) | Stretching rate (x/min.) | Stretch ratio | Average thickness (μ) | Tensile strength (kg/cm$^2$) | Elongation (%) | Tensile strength after maintaining at 150° C. for 24 hours (kg/cm$^2$) |
| 2 | 175 | 1.7 | 3.0 | 330 | 1300 | 16 | 1320 |
| 3 | 180 | 1.7 | 4.0 | 250 | 1410 | 14 | 1400 |
| 4 | 180 | 2.7 | 3.0 | 330 | 1350 | 16 | 1290 |
| 5 | 185 | 1.7 | 3.5 | 290 | 1230 | 18 | 1210 |

EXAMPLES 6 TO 9

The monoaxially stretched sheet obtained in Example 1 was heat-set by a high-temperature constant-humidity machine under the different heat-setting conditions shown in Table 3. The properties of the heat-set products are also shown in Table 3. By the same flame resistance test as in Example 1, the heat-set product of the monoaxially stretched sheet in Example 6 was found to be self-extinguishing.

TABLE 3

| | Heat-setting conditions | | Properties of the heat-set product | | |
|---|---|---|---|---|---|
| Example | Temperature (°C.) | Time (sec) | Tensile strength (kg/cm$^2$) | Elongation (%) | Tensile strength after maintaining at 150° C. for 24 hours (kg/cm$^2$) |
| 6 | 240 | 60 | 1570 | 14 | 1560 |
| 7 | 250 | 60 | 1620 | 13 | 1640 |
| 8 | 250 | 90 | 1550 | 15 | 1540 |
| 9 | 260 | 60 | 1430 | 15 | 1390 |

EXAMPLES 10 TO 12

Poly-1,3-phenylene terephthalate having an intrinsic viscosity of 0.77 was prepared by a method similar to that shown in Example 1, (1). The polyester was then compression-molded for 5 minutes at 310° C. and 40 kg/cm$^2$ by means of a press former, and then quenched to form a transparent sheet having a thickness of 0.3 mm. The sheet was monoaxially stretched by an Instron tensile tester under the stretching conditions shown in Table 4. The properties of the monoaxially stretched films are also shown in Table 4.

TABLE 4

| | Stretching conditions | | | Properties of monoaxially stretched sheet | | | |
|---|---|---|---|---|---|---|---|
| Example | Temperature (°C.) | Stretching rate (x/min.) | Stretch ratio | Average thickness (μ) | Tensile strength (kg/cm$^2$) | Elongation (%) | Tensile strength after maintaining at 150° C. for 24 hours (kg/cm$^2$) |
| 10 | 180 | 2.7 | 3.5 | 85 | 1750 | 19 | 1690 |
| 11 | 180 | 1.7 | 4.0 | 75 | 1860 | 16 | 1800 |
| 12 | 180 | 1.7 | 4.5 | 65 | 1890 | 12 | 1900 |

EXAMPLE 13

The monoaxially stretched film obtained in Example 11 was heat-set at 250° C. for 60 seconds using a high-temperature constant-humidity machine. The heat-set film had a tensile strength of 2010 kg/cm$^2$ and an elongation of 11% at break. After the heat-set film was maintained at 150° C. for 24 hours, it had a tensile strength at break of 2050 kg/cm$^2$. By the same flame resistance test as in Example 1, the heat-set film was found to be self-extinguishing.

EXAMPLES 14 TO 18

Poly-1,3-phenylene terephthalate having an intrinsic viscosity of 0.72 was prepared by a method similar to that shown in Example 1. The polyester was then compression-molded to form a sheet having a thickness of 1 mm. The sheet was then simultaneously stretched in the longitudinal and transverse directions by means of a biaxial stretching testing device. The stretching conditions and the properties of the resulting biaxially stretched sheets are shown in Table 5.

TABLE 5

| | Stretching conditions | | | | | Properties of the biaxially stretched film | | | |
|---|---|---|---|---|---|---|---|---|---|
| Example | Temperature (°C.) | Stretching rate in the machine direction (x/min.) | Stretching rate in the transverse direction (x/min.) | Stretch ratio in the machine direction | Stretch ratio in the transverse direction | Average thickness (μ) | Tensile strength (kg/cm$^2$) | Elongation (%) | Tensile strength after maintaining at 150° C. for 24 hours (kg/cm$^2$) |
| 14 | 170 | 4.7 | 4.7 | 2.0 | 2.0 | 250 | 1480 | 15 | 1500 |
| 15 | 175 | 4.7 | 4.7 | 2.0 | 2.0 | 250 | 1400 | 20 | 1350 |
| 16 | 175 | 4.7 | 4.7 | 2.5 | 2.5 | 160 | 1620 | 18 | 1600 |
| 17 | 175 | 4.7 | 3.9 | 2.5 | 3.0 | 130 | 1650 | 17 | 1610 |

TABLE 5-continued

| | Stretching conditions | | | | Properties of the biaxially stretched film | | | |
|---|---|---|---|---|---|---|---|---|
| Example | Temperature (°C.) | Stretching rate in the machine direction (x/min.) | Stretching rate in the transverse direction (x/min.) | Stretch ratio in the machine direction | Stretch ratio in the transverse direction | Average thickness ($\mu$) | Tensile strength (kg/cm$^2$) | Elongation (%) | Tensile strength after maintaining at 150° C. for 24 hours (kg/cm$^2$) |
| 18 | 180 | 4.7 | 4.7 | 2.0 | 2.0 | 250 | 1370 | 20 | 1400 |

EXAMPLES 19 AND 20

The biaxially stretched sheet of Example 16 was heat-set by means of a high-temperature constant-humidity machine. The heat-setting conditions and the properties of the heat-set products are shown in Table 6.

TABLE 6

| | Heat-setting conditions | | Properties of the heat-set product | | | | |
|---|---|---|---|---|---|---|---|
| Example | Temperature (°C.) | Time (sec) | Tensile strength (kg/cm$^2$) | Elongation (%) | Volume resistivity ($\Omega \cdot$ cm) | Tensile strength after maintaining at 150° C. for 24 hours (kg/cm$^2$) | Flame resistance |
| 19 | 250 | 60 | 1800 | 19 | $1.1 \times 10^{16}$ | 1800 | Self-extinguishing |
| 20 | 250 | 90 | 1820 | 18 | $1.0 \times 10^{16}$ | 1830 | Self-extinguishing |

EXAMPLES 21 TO 23

Poly-1,3-phenylene terephthalate having an intrinsic viscosity of 0.72 was prepared by a method similar to that shown in Example 1, (1). The polyester was extruded from a T-die using a 40 mm extruder to form a sheet having a thickness of 0.5 mm. The unstretched sheet was then simultaneously stretched in the longitudinal and transverse directions by means of a biaxial stretching device. The stretching conditions and the properties of the resulting biaxially stretched films are shown in Table 7.

EXAMPLES 24 TO 28

The unstretched sheet having a thickness of 0.5 mm obtained in Example 21 was stretched first in the longitudinal direction and then in the transverse direction by means of a biaxial stretching device to form a biaxially stretched film. The stretching conditions and the properties of the biaxially stretched films a shown in Table 8.

TABLE 8

| | Stretching conditions | | | | | | Properties of the biaxially stretched film | | | |
|---|---|---|---|---|---|---|---|---|---|---|
| | Stretching in the machine direction | | | Stretching in the transverse direction | | | | | | Tensile strength after main-ing at 150° C. for 24 hours (kg/cm$^2$) |
| Example | Temperature (°C.) | Rate (x/min) | Ratio | Temperature (°C.) | Rate (x/min) | Ratio | Average thickness ($\mu$) | Tensile strength kg/cm$^2$ | Elongation (%) | |
| 24 | 175 | 4.7 | 2.5 | 175 | 4.7 | 2.0 | 100 | 1500 | 18 | 1520 |
| 25 | 175 | 4.7 | 2.5 | 180 | 4.7 | 2.5 | 80 | 1580 | 17 | 1550 |
| 26 | 175 | 4.7 | 3.0 | 180 | 4.7 | 2.5 | 65 | 1610 | 16 | 1600 |
| 27 | 175 | 4.7 | 2.5 | 185 | 4.7 | 2.5 | 80 | 1600 | 16 | 1570 |
| 28 | 175 | 4.7 | 3.0 | 185 | 4.7 | 2.0 | 80 | 1570 | 16 | 1580 |

EXAMPLE 29

(1) A reactor was charged with 1000 parts of terephthalic acid, 1404 parts of resorcinol dipropionate, 0.07 part of zinc chloride dihydrate, and 0.35 part of antimony trioxide, and they were reacted at 275° C. for 5 hours while distilling off the resulting phenol in a nitrogen atmosphere out of the reaction system. Then, 1.36 parts of triphenyl phosphate was added to the reaction

TABLE 7

| | Stretching conditions | | | | Properties of the biaxially stretched film | | | | |
|---|---|---|---|---|---|---|---|---|---|
| Example | Temperature (°C.) | Stretching rate in the machine direction (x/min.) | Stretching rate in the transverse direction (x/min.) | Stretch ratio in the machine direction | Stretch ratio in the transverse direction | Average thickness ($\mu$) | Tensile strength (kg/cm$^2$) | Elongation (%) | Volume resistivity ($\Omega \cdot$ cm) | Tensile strength after maintaining at 150° C. for 24 hours (kg/cm$^2$) |
| 21 | 170 | 4.7 | 4.7 | 2.5 | 2.5 | 80 | 1900 | 25 | — | 1900 |
| 22 | 175 | 4.7 | 4.7 | 2.5 | 2.5 | 80 | 1850 | 30 | $1.2 \times 10^{16}$ | 1800 |
| 23 | 175 | 4.7 | 3.9 | 2.5 | 3.0 | 65 | 1880 | 30 | $1.1 \times 10^{16}$ | 1850 | mixture, and the mixture was further reacted at 280° C. for 2 hours. Further, the pressure of the reaction system was gradually reduced over the course of 3 hours to adjust a final pressure to 0.7 mmHg. Simultaneously, the temperature was raised to 350° C. The resulting poly-1,3-phenylene terephthalate had an intrinsic viscosity of 0.60 and a melting point of 285° C. The polyester was polymerized under a reduced pressure of 5 to 20 mmHg in the solid phase at 270° C. for 8 hours, then at 280° C. for 6 hours, and finally at 290° C. for 8 hours. The intrinsic viscosity of the polyester consequently rose to 1.05, and its melting point was 315° C.

(2) The poly-1,3-phenylene terephthalate obtained was then compression-molded by means of a press former to form a sheet having a thickness of 1 mm. The sheet was monoaxially stretched to 3.0 times at 180° C. by means of an Instron tensile tester at a stretching rate of 0.7X/min. Thus, a monoaxially stretched sheet having an average thickness of 330 microns was prepared. The monoaxially stretched sheet was found to have a tensile strength of 1450 kg/cm² and an elongation of 29% at break. After the monoaxially stretched sheet was maintained at 150° C for 24 hours, it had a tensile strength at break of 1420 kg/cm². By the same flame resistance test as in Example 1, the stretched sheet was found to be self-extinguishing.

EXAMPLE 30

(1) An alkaline aqueous solution of resorcinol was prepared from 110.1 parts of resorcinol, 82.7 parts of sodium hydroxide, 60 parts of sodium laurylsulfate, 2 parts of sodium hydrosulfite and 6600 parts of water, and cooled to 10° C. The aqueous solution was vigorously stirred, and a solution of 211.2 parts of terephthaloyl dichloride in 3030 parts of methylene chloride was added to the aqueous solution over the course of 30 seconds. With stirring, the mixture was reacted at 10° C. for 1 hour. After the reaction, the reaction mixture was poured into a large amount of acetone to precipitate the resulting poly-1,3-phenylene terephthalate. The precipitate was recovered by filtration, and repeatedly washed with water. The purified poly-1,3-phenylene terephthalate had an intrinsic viscosity of 1.30 and a melting point of 290° C.

(2) The resulting polyester was compression-molded by a press former to form a sheet having a thickness of 1 mm. The sheet was monoaxially stretched to 2.5 times at 180° C. by means of an Instron tensile tester at a stretching rate of 0.7X/min. to form a monoaxially stretched sheet having an average thickness of 400 microns. The stretched sheet was found to have a tensile strength of 1440 kg/cm² and an elongation of 36% at break. After the stretched sheet was maintained at 150° C. for 24 hours, it had a tensile strength at break of 1430 kg/cm². By the same flame resistance test as in Example 1, this monoaxially stretched sheet was also found to be self-extinguishing.

EXAMPLE 31

(1) A reactor was charged with 950 parts of diphenyl terephthalate, 50 parts of diphenylisophthalate, 346 parts of resorcinol, 1.03 parts of triphenyl phosphate and 0.18 parts of antimony trioxide, and they were reacted at 250° C. for 18 hours in an atmosphere of nitrogen while distilling off the resulting phenol out of the reaction system. Then, 12 parts of resorcinol was added to the reaction mixture, and the reaction was further carried out at 260° C. for 4 hours. Furthermore, over the course of 4 hours, the pressure of the reaction system was gradually reduce to a final pressure of 0.6 mmHg. At the same time, the temperature was raised to 345° C. There was obtained a polyester composed of 47.5 mole% of terephthalic acid units, 2.5 mole% of isophthalic acid units and 50 mole% of resorcinol units. The polyester had an intrisic viscosity of 0.69 and a melting point of 285° C.

(2) The polyester was press-formed and then quenched to form a transparent unstretched sheet having a thickness of 1 mm. The unstretched sheet was monoaxially stretched to 3.0 times at 175° C. by means of an Instron tensile tester at a stretching rate of 5X/min. to form a monoaxially stretched sheet having an average thickness of 330 microns. The stretched sheet had a tensile strength of 1900 kg/cm² and an elongation of 23% at break. After the stretched sheet was maintained at 150° C. for 24 hours, it had a tensile strength at break of 1890 kg/cm². By the same flame resistance test as in Example 1, this stretched sheet was found to be self-extinguishing.

EXAMPLES 32 AND 33

The same melt polymerization as in Example 31, (1) was carried out except that the amounts of diphenyl terephthalate and diphenyl isophthalate charged were changed as shown in Table 9. The polyesters shown in Table 9 were obtained. Monoaxially stretched sheets were prepared form these polyesters in accordance with the method of Example 31, (2), and subjected to a tensile test. The results are shown in Table 9.

TABLE 9

| | Copolyester | | Intrinsic Viscosity $[\eta]$ of th co-polyester (dl/g) | Stretching conditions | | | Properties of the monoaxially stretched sheet | | | |
|---|---|---|---|---|---|---|---|---|---|---|
| | Tere-phthalic acid unit (mole %) | Iso-phthalic acid unit (mole %) | | | | | Average thick-ness ($\mu$) | Tensile strength (kg/cm²) | Elong-gation (%) | Tensile strength after maintaining at 150° C. for 24 hours (kg/cm²) |
| Example | | | | Temperature (°C.) | Rate (x/min.) | Ratio | | | | |
| 32 | 49 | 1 | 0.71 | 180 | 5 | 3.0 | 320 | 2100 | 17 | 2050 |
| 33 | 42.5 | 7.5 | 0.68 | 175 | 5 | 3.0 | 330 | 1800 | 25 | 1810 |

EXAMPLE 34

(1) The same melt polycondensation as in Example 31, (1) was carried out using 1000 parts of diphenyl terephthalate, 340.6 parts of resorcinol and 34.3 parts of 4,4'-dihydroxydiphenyl thioether. There was obtained a polyester composed of 50 mole% of terephthalic acid units, 47.5 mole% of resorcinol units and 2.5 mole% of 4,4'-dihydroxyphenyl thioether units, and having an intrinsic viscosity of 0.72.

(2) The polyester was press-formed in the same way as in Example 31, (2) to form a transparent unstretched sheet having a thickness of 1 mm. The unstretched sheet was then stretched to 2.5 times at 180° C. both in the longitudinal and transverse directions at a rate of 4.7X/min. by means of a biaxially stretching device to form a biaxially stretched sheet having an average thickness of 150 microns. The stretched sheet had a tensile strength of 1590 kg/cm$^2$ and an elongation of 29% at break. When the stretched sheet was maintained at 150° C. for 24 hours, it had a tensile strength at break of 1600 kg/cm$^2$. The stretched sheet had a volume resistivity of $1.3\times10^{16}$ ohms-cm. By the same flame resistance test as in Example 1, the stretched sheet was found to be self-extinguishing.

EXAMPLE 35

(1) A polyester composed of 50 mole% of terephthalic acid units 42.5 mole% of resorcinol units and 7.5 mole% of 4,4'-dihydroxydiphenyl thioether units and having an intrinsic viscosity of 0.76 was prepared by melt-polycondensation under the same conditions as in Example 34, (1) except that the amount of resorcinol was changed to 306.0 parts and the amount of 4,4'-dihydroxydiphenyl thioether was changed to 102.9 parts.

(2) The polyester was press-formed in the same way as in Example 34, (2) to form a transparent unstretched sheet having a thickness of 1 mm. The unstretched sheet was stretched by means of a biaxially stretching device at 175° C. first in the longitudinal direction to 2.5 times at a stretching rate of 4.7X/min. and immediately then in the transverse direction to 2.5 times at a stretching rate of 4.7X/min. to form a biaxially stretched sheet having an average thickness of 150 microns. The biaxially stretched sheet had a tensile strength of 1550 kg/cm$^2$ and an elongation of 35% at break. After the stretched sheet was maintained at 150° C. for 24 hours, it had a tensile strength at break of 1520 kg/cm$^2$.

EXAMPLE 36

(1) A polyester composed of 50 mole% of terephthalic acid units, 47.4 mole% of resorcinol units and 2.6 mole% of 3-hydroxyphenyl-4-hydroxybenzoate units and having an intrinsic viscosity of 0.71 was produced by melt polycondensation in the same way as in Example 31, (1) except that 950 parts of diphenyl terephthalate, 340.6 parts of resorcinol and 21.7 parts of p-hydroxybenzoic acid were used as starting materials.

(2) The resulting polyester was extruded from a T-die using an extruder to form an unstretched sheet having a thickness of 0.5 mm. The unstretched sheet was simultaneously stretched at 180° C. by means of a biaxial stretching device both in the longitudinal and transverse directions to 2.5 times at a stretching rate of 4.7X/min. to form a biaxially stretched film having an average thickness of 80 microns. The biaxially stretched sheet had a tensile strength of 1800 kg/cm$^2$ and an elongation of 23% at break. After the stretched film was maintained at 150° C. for 24 hours, it had a tensile strength of 1770 kg/cm$^2$.

The stretched film was heat-set at 250° C. for 60 seconds by means of a high-temperature constant-humidity machine. The heat-set film had a tensile strength of 1850 kg/cm$^2$ and an elongation of 21% at break. After the heat-set film was maintained at 150° C. for 24 hours, it had a tensile strength of 1860 kg/cm$^2$.

EXAMPLE 37

(1) A reactor was charged with 1000 parts of diphenyl terephthalate, 346 parts of resorcinol, 40 parts of a polyester having an intrinsic viscosity of 0.65 and composed of terephthalic acid, isophthalic acid and bisphenol A units (wherein the ratio of the terephthalic acid units to the isophthalic acid units was 1:1), 1.03 parts of triphenyl phosphate and 0.13 part of antimony trioxide, and they were reacted at 250° C. for 15 hours in the same way as in Example 31, (1). Furthermore, 12 parts of resorcinol was added to the reaction mixture, and the reaction was carried out further at 260° C. for 4 hours as in Example 31, (1), and then over the course of 4 hours, the pressure of the reaction system was gradually reduced to a final pressure of 0.6 mmHg. Simultaneously, the temperature was raised to 345° C. Thus, there was obtained a polyester composed of 49.6 mole% of terephthalic acid units, 0.4 mole% of isophthalic acid units, 49.1 mole% of resorcinol units and 0.9 mole% of bisphenol A units and having an intrinsic viscosity of 0.65.

(2) The resulting polyester was press-formed in the same way as in Example 31, (2) to form a transparent unstretched sheet having a thickness of 0.5 mm. The unstretched sheet was stretched at 180° C. by means of a biaxial stretching device simultaneously both in the longitudinal and transverse directions to 2.5 times at a stretching rate of 10X/min. to form a biaxially stretched film having an average thickness of 75 microns. The biaxially stretched film had a tensile strength of 1580 kg/cm$^2$ and an elongation of 27% at break. After the stretched sheet was maintained at 150° C. for 24 hours, it had a tensile strength at break of 1560 kg/cm$^2$.

EXAMPLE 38

(1) A reactor was charged with 1000 parts of diphenyl terephthalate, 346 parts of resorcinol, 1.03 parts of triphenyl phosphate, and 0.13 part of antimony trioxide, and they were reacted at 250° C. for 15 hours in the same way as in Example 31, (1). Then, 12 parts of resorcinol and 40 parts of a polyester having an intrinsic viscosity of 0.65 and composed of 25 mole% of terephthalic acid units, 25 mole% of isophthalic acid units and 50 mole% of bisphenol A units were added to the reaction mixture, and the reaction was further carried out at 260° C. for 4 hours as in Example 31, (1). Then, over the course of 4 hours, the pressure of the reaction mixture was gradually reduced to a final pressure of 0.6 mmHg, and simultaneously the temperature was raised to 345° C. Thus, a polyester having an intrinsic viscosity of 0.69 and composed of 49.6 mole% of terephthalic acid units, 0.4 mole% of isophthalic acid units, 49.1 mole% of resorcinol units, and 0.9 mole% of bisphenol A units was obtained.

(2) The resulting polyester was press-formed in the same way as in Example 31, (2) to form a transparent unstretched sheet having a thickness of 0.5 mm. The unstretched sheet was then stretched at 175° C. by means of a biaxial stretching device simultaneously both in the longitudinal and transverse directions to 2.5 times at a stretching rate of 10X/min. to prepare a biaxially stretched film having an average thickness of 70 microns. The biaxially stretched film had a tensile strength of 1600 kg/cm$^2$ and an elongation of 28% at break.

EXAMPLE 39

(1) Diphenyl terephthalate (1000 parts) and 346 parts of resorcinol were reacted at 250° C. for 15 hours in the same way as in Example 38, (1). Separately, in the same way as above, 1000 parts of diphenyl isophthalate and 346 parts of hydroquinone were reacted at 250° C. for 15 hours using 1.03 parts of triphenyl phosphate and 0.13 part of antimony trioxide as catalysts. Then, 500 parts of the reaction product of diphenyl terephthalate and resorcinol, 25 parts of the reaction product of the diphenyl isophthalate and hydroquinone, and 6 parts of resorcinol were polycondensed at 260° C. for 4 hours in the same way as in Example 31, (1). Then, over the course of 4 hours, the pressure of the reaction system was gradually reduced to a final pressure of 0.6 mmHg, and simultaneously, the temperature was raised to 350° C. There was obtained a polyester composed of 47.6 mole% of terephthalic acid units, 2.4 mole% of isophthalic acid units, 47.6 mole% of resorcinol units and 2.4 mole% of hydroquinone units. The resulting polyester was polymerized in the solid phase at 270° C. and 10 to 15 mmHg for 16 hours to give a polyester having an intrinsic viscosity of 0.83 and composed of 47.6 mole% of terephthalic acid units, 2.4 mole% of isophthalic acid units, 47.6 mole% of resorcinol units and 2.4 mole% of hydroquinone units.

(2) The resulting polyester was press-formed in the same way as in Example 31, (2) to form an unstretched sheet having a thickness of 1 mm. The unstretched sheet was stretched at 185° C. by means of a biaxial stretching device simultaneously both in the longitudinal and transverse directions to 3.0 times at a stretching rate of 1.7X/min. to form a biaxially stretched sheet having an average thickness of 110 microns. The biaxially stretched sheet had a tensile strength of 1720 kg/cm$^2$ and an elongation of 32% at break.

EXAMPLE 40

(1) A polyester having an intrinsic viscosity of 0.64 and composed of 50 mole% of terephthalic acid units, 48.4 mole% of resorcinol units and 1.6 mole% of ethylene glycol units was prepared by melt polycondensation in the same way as in Example 37, (1) except that 40 parts of polyethylene terephthalate having an intrinsic viscosity of 0.63 was used instead of the polyester composed of the terephthalic acid units, isophthalic acid units and bisphenol A units.

(2) The resulting polyester was press-formed in the same way as in Example 31, (2) to form an unstretched sheet having a thickness of 1 mm. The unstretched sheet was stretched at 175° C. by means of a biaxial stretching device simultaneously both in the longitudinal and transverse directions to 3.0 times at a stretching rate of 10X/min. to form a biaxially stretched sheet having an average thickness of 110 microns. The biaxially stretched sheet had a tensile strength of 1620 kg/cm$^2$ and an elongation of 35% at break. It had a tear strength, measured in accordance with JIS KL6781, of 120 kg/cm$^2$. By the same flame resistance test as in Example 1, the stretched sheet was found to be self-extinguishing.

EXAMPLE 41

(1) Dimethyl terephthalate (1000 parts) and 639 parts of ethylene glycol were reacted in the presence of 5 parts of zinc acetate dihydrate as a catalyst by raising the temperature gradually from 150° C. to 220° C. over the course of 5 hours while removing the resulting methanol. Twenty-five parts of the resulting bishydroxyethyl terephthalate or its oligomer was used instead of the reaction product of diphenyl isophthalate and hydroquinone in Example 39, (1). Otherwise, the same melt polycondensation as in Example 39, (1) was carried out to prepare a polyester having an intrinsic viscosity of 0.62 and composed of 50 mole% of terephthalic acid units 47 mole% of resorcinol units and 3 mole% of ethylene glycol units.

(2) The resulting polyester was press-formed in the same way as in Example 31, (2) to form an unstretched sheet having a thickness of 1 mm. The unstretched sheet was stretched at 175° C. by means of a biaxial stretching device simultaneously both in the longitudinal and transverse directions to 3.0 times at a stretching rate of 10X/min. to form a biaxially stretched sheet having an average thickness of 110 microns. The biaxially stretched sheet had a tensile strength of 1650 kg/cm$^2$ and an elongation of 33% at break.

EXAMPLE 42

(1) The same melt polycondensation as in Example 38, (1) was carried out except that 40 parts of a polyester composed of 50 mole% of terephthalic acid units, 42 mole% of ethylene glycol units and 8 mole% of cyclohexanedimethanol units (KODAR® PETG COPOLYESTER 6763, a trademark for a product of Eastman Chemical, INC) was used instead of the polyester composed of terephthalic acid, isophthalic acid and bisphenol A units. There was obtained a polyester having an intrinsic viscosity of 0.65 and composed of 50.0 mole% of terephthalic acid units, 48.5 mole% of resorcinol units, 1.25 mole% of ethylene glycol units and 0.25 mole% of cyclohexane dimethanol units.

(2) The resulting polyester was press-formed by the same method as in Example 31, (2) to form an unstretched sheet having a thickness of 1 mm. The unstretched sheet was stretched at 175° C. by means of a biaxial stretching device simultaneously both in the longitudinal and transverse directions to 3.0 times at a stretching rate of 10X/min. to form a biaxially stretched sheet having an average thickness of 110 microns. The biaxially stretched sheet had a tensile strength of 1690 kg/cm$^2$ and an elongation of 36% at break.

EXAMPLE 43

(1) A reactor was charged with 950 parts of terephthalic acid, 1334 parts of resorcinol dipropionate, 36 parts of acetoxyacetic acid, 0.07 part of zinc chloride dihydrate and 0.35 part of antimony trioxide. In an atmosphere of nitrogen, the temperature was raised from 220° C. to 275° C. over the course of 5 hours, and the reaction was carried out while distilling off the resulting propionic acid and acetic acid out of the reaction system. Then, 1.36 parts of triphenylphosphate was added to the reaction mixture, and the reaction was carried out further at 280° C. for 2 hours. Then, the pressure of the reaction system was gradually reduced over the course of 3 hours to adjust it to a final pressure of 0.7 mmHg, and simultaneously, the temperature was raised to 350° C. There was obtained a polyester having an intrinsic viscosity of 0.67 and composed of 47.5 mole% of terephthalic acid units, 50 mole% of resorcinol units and 2.5 mole% of monocarboxymethyl terephthalate units.

(2) The resulting polyester was press-formed in the same way as in Example 31, (2) to form an unstretched sheet having a thickness of 1 mm. Then, the unstretched sheet was biaxially stretched at 180° C. by means of a biaxial stretching device simultaneously both in the longitudinal and transverse directions to 3.0 times at a stretching rate of 5X/min. to form a biaxially stretched sheet having an average thickness of 110 microns. The biaxially stretched sheet had a tensile strength of 1630 kg/cm$^2$ and an elongation of 30% at break. After the stretched sheet was maintained at 150° C. for 24 hours, it had a tensile strength of 1600 kg/cm$^2$.

EXAMPLE 44

(1) An alkaline aqueous solution of resorcinol was prepared from 110.1 parts of resorcinol, 82.7 parts of sodium hydroxide, 60 parts of sodium laurylsulfate, 2 parts of sodium hydrosulfite, and 6600 parts of water, and cooled to 10° C. The aqueous solution was vigorously stirred, and a solution of 196.7 parts of terephthaloyl dichloride and 11.0 parts of adipoyl dichloride in 3030 parts of methylene chloride was added to the aqueous solution over the course of about 30 seconds. With stirring, the mixture was reacted at 10° to 15° C. for 1 hour. After the reaction, the reaction mixture was poured into a large amount of acetone to precipitate the resulting polyester. The polyester was collected by filtration, and repeatedly washed with water to purify it. There was obtained a purified polyester having an intrinsic viscosity of 0.91 and composed of 47 mole% of terephthalic acid units, 3 mole% of adipic acid units and 50 mole% of resorcinol units.

(2) The resulting polyester was press-formed in the same way as in Example 31, (2) to form an unstretched sheet having a thickness of 1 mm. The unstretched sheet was stretched at 170° C. by means of a biaxial stretching device simultaneously both in the longitudinal and transverse directions to 3.0 times at a stretching rate of 5X/min. to form a biaxially stretched sheet having an average thickness of 110 microns. The biaxially stretched sheet had a tensile strength of 1480 kg/cm$^2$ and an elongation of 35% at break. It also had a tear strength, measured in the same way as in Example 40, (2), of 120 kg/cm$^2$.

EXAMPLE 45

(1) Diphenyl terephthalate (1000 parts), 353 parts of resorcinol and 7.0 parts of 1,3,5-trihydroxybenzene dihydrate were polycondensed in the molten state in the same way as in Example 31 to form a polyester having an intrinsic viscosity of 0.70 and composed of 50 mole% of terephthalic acid units, 49 mole% of resorcinol units and 1 mole% of 1,3,5-trihydroxybenzene components.

(2) The resulting polyester was press-formed in the same way as in Example 31, (2) to form an unstretched sheet having a thickness of 1 mm. The unstretched sheet was stretched at 185° C. by means of a biaxial stretching device simultaneously both in the longitudinal and transverse directions to 3.0 times at a stretching rate of 5X/min. to form a biaxially stretched sheet having an average thickness of 110 microns. The biaxially stretched sheet had a tensile strength of 1820 kg/cm$^2$ and an elongation of 25% at break. It also had a tear strength, measured in the same way as in Example 40, (2), of 100 kg/cm$^2$.

EXAMPLE 46

(1) Diphenyl terephthalate (950 parts), 337 parts of resorcinol, 21.7 parts of p-hydroxybenzoic acid and 6.6 parts of 1,3,5-trihydroxybenzene were polycondensed in the molten state in the same way as in Example 31, (1) to form a polyester having an intrinsic viscosity of 0.68 and composed of 50.2 mole% of terephthalic acid units, 46.3 mole% of resorcinol units, 2.6 mole% of 3-hydroxyphenyl 4-hydroxybenzoate units and 0.9 mole% of 1,3,5-trihydroxybenzene units.

(2) The resulting polyester was press-formed in the same way as in Example 31, (2) to form an unstretched sheet having a thickness of 1 mm. The unstretched sheet was then stretched at 185° C. by means of a biaxial stretching device simultaneously both in the longitudinal and transverse directions to 3.0 times at a stretching rate of 5X/min. to form a biaxially stretched sheet having an average thickness of 110 microns. The biaxially stretched sheet had a tensile strength of 1840 kg/cm$^2$ and an elongation of 25% at break.

EXAMPLE 47

(1) Diphenyl terephthalate (990 parts), 358 parts of resorcinol, and 13.4 parts of triphenyl 1,3,5-benzenetricarboxylic acid were polycondensed in the molten state in the same way as in Example 31, (1) to form a polyester having an intrinsic viscosity of 0.68 and composed of 49.5 mole% of terephthalic acid units, 50 mole% of resorcinol units and 0.5 mole% of 1,3,5-benzenetricarboxylic acid units.

(2) The resulting polyester was press-formed in the same way as in Example 31, (2) to form an unstretched sheet having a thickness of 1 mm. The unstretched sheet was stretched at 185° C. by means of a biaxial stretching device simultaneously both in the longitudinal and transverse directions to 3.0 times at a stretching rate of 5X/min. to form a biaxially stretched sheet having an average thickness of 110 microns. The biaxially stretched sheet had a tensile strength of 1920 kg/cm$^2$ and an elongation of 26% at break. It also had a tear strength, measured by the same method as in Example 20, (2), of 120 kg/cm$^2$.

EXAMPLE 48

(1) Terephthalic acid (995 parts), 1390 parts of resorcinol dipropionate and 8 parts of γ-resorcylic acid dipropionate were polycondensed in the molten state in the same way as in Example 43, (1) to form a polyester having an intrinsic viscosity of 0.73 and composed of 49.9 mole% of terephthalic acid units, 49.8 mole% of resorcinol units and 0.3 mole% of 1-carboxy-3,5-bis(4-carboxybenzoyloxy)benzene units.

(2) The resulting polyester was press-formed in the same way as in Example 31, (2) to form an unstretched sheet having a thickness of 1 mm. The unstretched sheet was stretched at 185° C. by means of a biaxially stretched device simultaneously both in the longitudinal and transverse directions to 3.0 times at a stretching rate of 5X/min. to form a biaxially stretched sheet having an average thickness of 110 microns. The biaxially stretched sheet had a tensile strength of 1780 kg/cm$^2$ and an elongation of 23% at break.

EXAMPLE 49

(1) The same melt polycondensation as in Example 39, (1) was carried out except that 25 parts of a mixture of hydroxyethyl terephthalate, trihydroxyethyl glycerate and oligomers of these, which was prepared by reacting 1000 parts of dimethyl terephthalate, 575 parts of ethylene glycol and 43 parts of glycerol in the presence of 5 parts of zinc acetate dihydrate as a catalyst by raising the temperature from 150° C. to 220° C. over the course of 5 hours while removing the resulting methanol, was used instead of the reaction product of diphenyl terephthalate and hydroquinone. Thus, there was formed a polyester having an intrinsic viscosity of 0.65 and composed of 50.0 mole% of terephthalic acid, 46.8 mole% of resorcinol units, 3.0 mole% of ethylene glycol units and 0.2 mole% of glycerol units.

(2) The resulting polyester was press-formed in the same way as in Example 31, (2) to form an unstretched sheet having a thickness of 1 mm. The unstretched sheet was stretched at 180° C. by means of a biaxial stretching device simultaneously both in the longitudinal and transverse directions to 3.0 times at a stretching rate of 5X/min. to form a biaxially stretched sheet having an average thickness of 110 microns. The stretched sheet had a tensile strength of 1720 and an elongation of 26% at break.

COMPARATIVE EXAMPLE 1

The poly-1,3-phenylene terephthalate obtained in Example 1 was press-formed in the same way as in Example 1 to form a sheet having a thickness of 0.5 mm. The sheet had the properties shown in Table 1.

COMPARATIVE EXAMPLE 2

The polyester obtained in Example 38 composed of terephthalic acid, isophthalic acid, resorcinol and bisphenol A units was press-formed in the same way as in Example 1 to form a sheet having a thickness of 0.5 mm. The properties of the sheet are shown in Table 1.

COMPARATIVE EXAMPLE 3

Poly-1,3-phenylene terephthalate having an intrinsic viscosity of 0.38 prepared by the same method as in Example 1 was press-formed in the same way as in Example 1, and then stretched monoaxially to 2.0 times at 180° C. at a rate of 17X/min. to form a monoaxially stretched film. The properties of the film are shown in Table 1.

COMPARATIVE EXAMPLE 4

(1) An alkaline aqueous solution of resorcinol was prepared from 110.1 parts of resorcinol, 82.7 parts of sodium hydroxide, 60 parts of sodium laurylsulfate, 2 parts of sodium hydroxide and 6600 parts of water, and cooled to 15° C. The aqueous solution was vigorously stirred, and a solution of 211.2 parts of terephthaloyl dichloride in 3030 parts of methylene chloride was added to the aqueous solution over the course of about 30 seconds. With stirring, the mixture was reacted at 15° C. for 1 hour. After the reaction, the reaction mixture was poured into a large amount of acetone to precipitate the resulting poly-1,3-phenylene terephthalate. The precipitate was collected by filtration, and repeatedly washed with water to purify the polymer. There was obtained poly-1,3-phenylene terephthalate having an intrinsic viscosity of 2.08 and a melting point of 290° C.

(2) The resulting polyester was compression-molded by a press-former to form a sheet having a thickness of 1 mm. The sheet was then monoaxially stretched at 135° C. by means of an Instron tensile tester to 3.0 times at a stretching rate of 1.7X/min. As shown in Table 1, the stretched film had thickness unevenness, and therefore, had a low tensile strength.

What we claim is:

1. A monoaxially or biaxially stretched film structure, or a heat-set structure thereof, of an unstretched film of an aromatic polyester of the poly-1,3-phenylene terephthalate type, said aromatic polyester having an intrinsic viscosity, determined in p-chlorophenol at 50° C., of 0.4 to 2.0 and being composed of (A) polybasic carboxylic acid component units consisting of terephthalic acid units ($a_1$) and units ($a_2$) of a polybasic carboxylic acid other than terephthalic acid, the proportion of the units ($a_2$) being up to 25 mole% based on the units ($a_1$) and units ($a_2$) combined, and (B) polyol component units consisting of resorcinol units ($b_1$) and units ($b_2$) of a polyol other than resorcinol, the proportion of the units ($b_2$) being up to 25 mole% based on the units ($b_1$) and ($b_2$) combined, the stretched film having a crystallinity of 15 to 55%.

2. The stretched film structure of claim 1 wherein the proportion of the polybasic carboxylic acid other than terephthalic acid is up to 20 mole%, and the proportion of the polyol other than resorcinol is up to 20 mole%.

3. The stretched film structure of claim 1 wherein the units ($a_2$) consist of units ($a_2$-1) of a dibasic carboxylic acid other than terephthalic acid and units ($a_2$-2) of a tribasic or higher carboxylic acid, and the proportion of the units ($a_2$-2) is 0.01 to 5 mole% based on the polybasic carboxylic acid component units [A].

4. The stretched film structure of claim 1 wherein the units ($b_2$) consists of units ($b_2$-1) of a diol other than resorcinol and units ($b_2$-2) of a trihydric or higher polyol, and the proportion of the units ($b_2$-2) is 0.01 to 5 mole% based on the polyol component units [B].

5. The stretched film structure of claim 3 wherein units ($a_2$-2) comprise carboxylic acids having 3 to 5 basic groups.

6. The stretched film structure of claim 4 wherein units ($b_2$-2) comprise polyols having 3 to 5 hydroxy groups.

* * * * *